July 4, 1944.  N. L. HAIGHT  2,352,953
STRAIN GAUGE
Filed Aug. 4, 1942
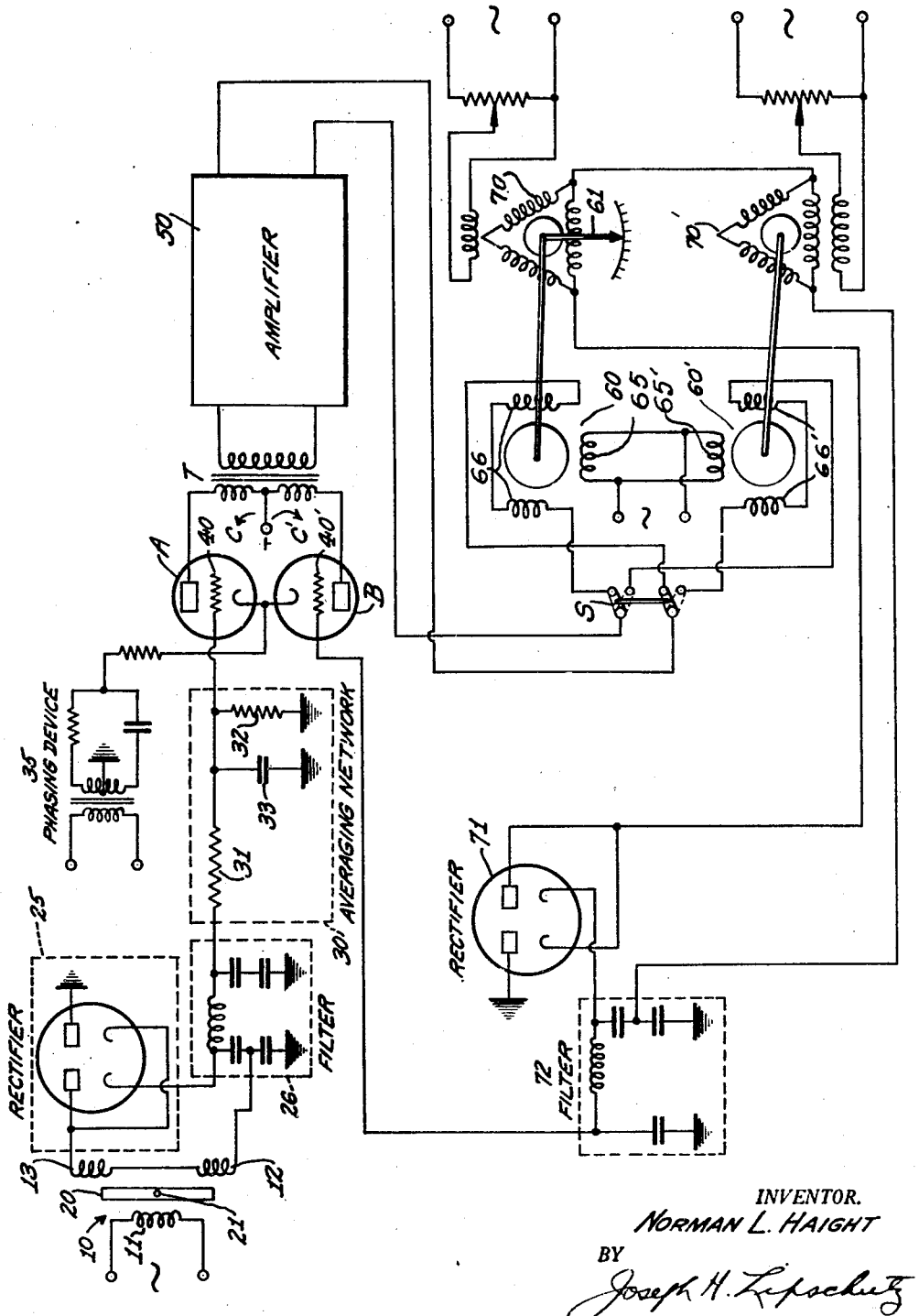
INVENTOR.
NORMAN L. HAIGHT
BY
Joseph H. Lipschutz
ATTORNEY Patented July 4, 1944

2,352,953

UNITED STATES PATENT OFFICE 2,352,953

STRAIN GAUGE

Norman L. Haight, Hoboken, N. J., assignor to Sperry Products, Inc., Hoboken, N. J., a corporation of New York Application August 4, 1942, Serial No. 453,529

2 Claims. (Cl. 265—1)

This invention relates to strain or pressure gauges for rolling mills and the like designed to measure the high pressures which originate in continuous rolling mills. These pressures are on the order of several million pounds and, in order to measure them, advantage is taken of the fact that the strain or deformation in the rolling mill frame is a function of the pressures which exist between the pressure rolls. As a means responsive to the deformation of the frame, various devices may be employed, such as, for example, a balanced transformer having an armature adapted to be moved by the deformations of the frame and in such relation to the balanced transformer as to upset said balance and generate a voltage signal which after being duly amplified may be caused to operate an indicator.

Because deformation of the rolling mill frame may be caused by other factors than the pressure existing between the work rolls, principally by the factor of temperature, errors would be introduced in the indication of pressures existing between the rolls if compensation were not made for the pressures introduced by the extraneous factors. In other words, a new base line must be continuously established corresponding to the pressures of the extraneous factors so that only the increment over and above such pre-existing pressures will be indicated since this is the true measure of the pressure between the work rolls generated by material passing between the rolls. In order to compensate for the extraneous factors, such as temperature, which tend to give a false zero base line from which pressure increments would otherwise be measured, there has been provided in strain gauges means for compensating for these extraneous factors during the interval when no material is passing between the work rolls. Therefore any pressures which were introduced in the frame when no material was passing through the work rolls were due to the extraneous factors, and a signal which was generated by the strain responsive member was caused to operate mechanism including a potentiometer for introducing a signal equal and opposite to that generated by the strain responsive member. Therefore when material passed between the work rolls and the compensating means was rendered ineffective and the indicating means was rendered effective, only the increment in pressure over and above the compensated factors was indicated. Similarly, when the indicating means was effective, the pressure responsive member generated a signal which was a function of the pressure, and this signal was caused to set in motion follow-up mechanism including a potentiometer for generating a signal equal and opposite to the first signal. When the two were equal, the operation of the indicating mechanism stopped and the degree of operation was a measure of the pressure.

The use of a potentiometer, however, was found in practice to offer considerable difficulty and many disadvantages due to the fact that the potentiometer contact tended to corrode, dirt and dust tended to collect between the contact and the potentiometer coil, wearing of the contact and coil on which it operated tended to change the potentiometer resistance, and, further, a certain vibratory action of the motor was set up because of the erratic contact. Such erratic contact was due to the oxidation and carbonization of the resistance element and the contact element, to the dirt deposited on the potentiometer and to the varying contact potentials resulting from the resistance element and the contact element being formed of different materials.

It is therefore one of the principal objects of this invention to provide means for generating signals, either in the compensating or indicating follow-up systems, which will not depend upon potentiometers with their contacts moving over coils, but on the contrary will employ non-contacting means for generating the necessary counter-voltage. For this purpose, I may employ a variable voltage transformer of the field and armature type, as for instance, the non-contacting Selsyn motor type.

In the strain gauge for rolling mills as described above, it was found that a plurality of cyclical variations were introduced by certain factors which were inherent in the rolling mill. Thus, for instance, it cannot be avoided that the work rolls should develop certain eccentricities during operation owing to the high pressures under which they operate and to the high speeds with which material passes between them. It will readily be apparent that if even slightly out of center contours develop, a cyclical variation in the pressures applied to the material being rolled will be impressed. Heretofore the pressure responsive element picked up all of these variations, with the result that the indicating needles representing the pressures at the front and rear frames of each rolling mill stand, set up at times a rapid oscillation which made it difficult for an operator to read the scale. As a consequence, there were times when the operator completely disregarded the indications until such vibrations ceased. These rapid variations in pressure resulting from a cyclical factor such as eccentricity, arose also from various other factors present in the mill, such as skewing of the rolls, etc.

It is therefore another object of this invention to provide means which will iron out the short period cyclical variations and transmit an average of the pressures persisting through predetermined intervals of time. Thus, for instance, a time constant may be introduced which will give the average pressure persisting for a period corresponding to one or more complete revolutions of the pressure rolls. In this manner, only the longer period variations due to a factor which is not cyclical but which is unidirectional for at least a predetermined interval of time, will be indicated.

Further objects and advantages of this invention will become apparent in the following detailed description thereof.

The accompanying drawing is an assembly wiring diagram showing one embodiment of my invention.

The pressure or strain responsive element which is designed to detect deformation in the rolling mill stand frame may comprise a gauge 10 including a primary coil 11 which may be supplied with power from any suitable source, such as a 110 volt, 60 cycle, A. C. source, and is in predetermined relation with respect to a pair of secondary coils 12 and 13. A pivoted armature 20 is provided in cooperative relation with the primary coil 11 and its secondary coils 12 and 13 and so positioned that when the frame is without load the armature is in predetermined position with respect to primary 11 and secondary 12 on the one hand, and primary 11 and secondary 13 on the other hand, so that normally pulses are derived from the secondary windings so that normally either no signal or a predetermined signal is obtained. The armature 20 is so connected to the mill frame that it will be actuated about its pivot 21 when the frame is subjected to strain, and when so moved around its pivot the armature will decrease the gap between it and one secondary coil and will increase the gap between it and the other secondary coil. Thus a change in E. M. F. will be generated by the coils 12 and 13, the magnitude of which will be a function of the strain upon the mill stand frame.

In order to measure the degree of the generated differential signal from the gauge member 10, and therefore in order to obtain an indication of the strain or pressure existing in the frame, the generated signal is passed through a rectifier 25 which will generate unidirectional pulses and then through a filter 26 which will give a continuous D. C., the output of which is then passed into a signal averaging network 30. This network comprises resistances 31, 32 and a condenser 33 which factors may be so chosen as to introduce a time constant of any predetermined length necessary to average out cyclical variations. Thus, for instance, those cyclical variations which are caused by eccentricity of the rolls and which therefore occur twice in each revolution of the roll, will vary the pressure generated in the mill stand frame and therefore the signal transmitted to the network 30 twice during each revolution. By means of the averaging network just described, however, these variations can be caused to average out over a period of 2, 4 or even more cycles of rotation of the rolls as desired. Thus the increase and decrease above and below the normal signal will be averaged out and only that signal due to the actual increment in pressure existing in the mill stand frame will be passed by the signal averaging network 30. It will be understood that the factors comprising the averaging network may be chosen in accordance with whatever conditions prevail, and therefore in accordance with the number and degree of cyclical variations which are present.

The signal thus averaged out to eliminate cyclical variations is caused to operate an indicator by reason of having the output of the signal averaging network 30 place a potential upon the grid 40 of a tube A to vary the current passing through an electronic circuit in said tube. The said circuit C is normally energized from a suitable source of A. C. power by way of the primary winding of a transformer T. The circuit C is normally counter-balanced by a circuit C' in tube B and energized from the same A. C. source. The placing of a potential upon grid 40 of tube A, however, disturbs the balance which exists between the circuits C and C' so that an output signal of a given phase is impressed upon the power amplifier 50. The output from the amplifier passes by way of a switch S to a motor 60 to drive the indicator arm 61. The motor is shown as provided with a field winding 65 and shading pole windings 66.

It will be understood that unless some balancing mechanism were employed to generate a signal sufficient to balance that generated in the gauge 10, no useful indication by indicator 61 would be obtained because said indicator would continue to operate indefinitely. In order, therefore, that the degree of actuation of indicator 61 shall be proportional to the signal generated by gauge 10, a balancing mechanism is set into operation by the motor 60 at the same time that the indicator 61 commences to operate. The said mechanism may comprise a variable voltage transformer of the non-contacting type, such as a selsyn motor 70 whose armature is connected to the armature of motor 60, and will be actuated thereby to generate a voltage which after being rectified by rectifier 71 and filtered by filter 72 will yield a D. C. potential which is then applied to the grid 40' of the tube B. When the potential on the grid 40' builds up to equality with the potential on grid 40, the two circuits C and C' are again balanced and there will be no output to the amplifier, so that the operation of motor 60 will cease. Thus the position of pointer 61 at the time that motor 60 stops will be an indication of the magnitude of the signal generated by the gauge 10 and therefore an indication of the pressure existing in the mill stand frame.

The rectifiers 25 and 71 are conventional voltage doubling devices, shown, for example, in the text book by Hund entitled "Phenomena in High Frequency Systems," published by McGraw-Hill Company, 1936, see Figure 125, page 183.

When the pressure falls off and the potential on grid 40' of tube B exceeds the potential on grid 40 of tube A, the output of opposite phase enters the power amplifier and causes reversal of the operation of motor 60 and hence reversal of operation of the variable voltage transformer or Selsyn motor 70 to decrease the signal impressed upon the grid 40'.

A phasing network 35 is provided to bring the output of the amplifier 50 into proper phase relation to excitation of both motors 60 and 60' to secure proper direction of motor rotation.

As fully explained in the introduction hereto, other factors, notably temperature, will cause strain to be placed upon the mill stand frame and therefore will affect the gauge or responsive member 10 to generate a signal which will yield an error in the indication of actual pressure existing between the pressure rolls. For this reason means are provided whereby in those intervals when no material is passing through the rolls and the mill stand frame is in ineffective condition, compensating means operate to neutralize the signal which is generated by the extraneous factors and thus provide a new zero base line from which the actual pressures which exist in the frame when material is being rolled can be indicated. For this purpose, when no material is being rolled, switch S is operated to the dotted line position, preferably by some automatic means known in the art, so as to render indicating motor 60 ineffective to be actuated by the output of the amplifier but will render a compensating motor 60' effective. Thus, with switch S in the dotted line position, any signal that comes out of gauge 10 and through the amplifier is due to the extraneous factors heretofore mentioned and the object is to neutralize these factors so that when the material starts moving through the mill stand frame there will be a new zero base line, in other words, no carry over of signal due to these extraneous factors. For this purpose, in the interval that no material is being rolled and switch S is in dotted line position, any signal coming through will actuate motor 60' to operate a variable voltage transformer of the non-contacting type such as Selsyn motor 70' similar to Selsyn motor 70, to place equalizing bias on grid 40' of tube B to bring the circuits C and C' into equality. Thus it will be seen that with the circuits C and C' brought to equality while switch S is in dotted line position, all of the extraneous factors which tended to generate a signal from gauge 10 have been neutralized, and any signal that comes through the amplifier when switch S is in full line position will be due to the actual pressure existing between rolls of the mill due to material passing therethrough and will not be due to extraneous factors which have previously affected the mill stand frame.

It will be noted that in the case of both indication and compensation the balancing is effected without the use of a contactor member such as the potentiometers heretofore employed, and therefore all of the difficulties of operation which have been caused by said potentiometers are avoided. Furthermore, all variations in indication of short period and cyclical nature are averaged out by the means heretofore described, so that it is possible to read the indicator at all times because said indicator is moving relatively slowly, if at all, in response only to the longer period, unidirectional changes in the pressures existing in the mill stand frame.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a strain gauge for rolling mills and the like, means whereby strain in the mill generates a voltage, a motor, means whereby said motor is controlled by said voltage, an indicator adapted to be actuated by said motor, and a balancing mechanism for generating a voltage for balancing said first voltage, said mechanism including a variable voltage transformer of the non-contacting, Selsyn type adapted to be actuated by said motor.

2. In a strain gauge for rolling mills and the like, means whereby strain in the mill generates a voltage, and means for compensating for strain in the mill due to extraneous causes other than material passing between the rolls, said last named means comprising a compensating motor, means whereby said motor is controlled by voltages generated by strains due to said extraneous causes, and a balancing mechanism for generating a voltage for balancing voltages generated by said extraneous causes, said mechanism including a variable voltage transformer of the non-contacting, Selsyn type adapted to be actuated by said motor.

NORMAN L. HAIGHT.